(12) United States Patent
Naoi (10) Patent No.: US 10,967,809 B2
(45) Date of Patent: Apr. 6, 2021

(54) CLIP

(71) Applicant: Nifco Inc., Yokosuka (JP)

(72) Inventor: Hajime Naoi, Yokosuka (JP)

(73) Assignee: NIFCO INC., Yokosuka (JP)

( * ) Notice: Subject to any disclaimer, the term of this patent is extended or adjusted under 35 U.S.C. 154(b) by 0 days.

(21) Appl. No.: 16/609,922

(22) PCT Filed: May 10, 2018

(86) PCT No.: PCT/JP2018/018173
§ 371 (c)(1),
(2) Date: Oct. 31, 2019

(87) PCT Pub. No.: WO2018/212072
PCT Pub. Date: Nov. 22, 2018

(65) Prior Publication Data
US 2020/0114838 A1 Apr. 16, 2020

(30) Foreign Application Priority Data
May 17, 2017 (JP) .............................. JP2017-098541

(51) Int. Cl.
*B60R 13/02* (2006.01)
*B60R 21/213* (2011.01)
(Continued)

(52) U.S. Cl.
CPC ........ *B60R 13/0206* (2013.01); *B60R 21/213* (2013.01); *B60R 21/2155* (2013.01);
(Continued)

(58) Field of Classification Search
CPC .............. B60R 21/213; B60R 13/0206; B60R 21/2155; B60R 2013/0287; B60R 21/216;
(Continued)

(56) References Cited

U.S. PATENT DOCUMENTS 7,841,817 B2 * 11/2010 Kawai ................ F16B 19/1081
411/41
8,043,038 B2 * 10/2011 Sano ................... F16B 19/1081
24/297
(Continued)

FOREIGN PATENT DOCUMENTS

| JP | 2011133014 A | 7/2011 |
| JP | 2012153188 A | 8/2012 |
| JP | 5576307 B2 | 8/2014 |

OTHER PUBLICATIONS

English translation of International Search Report for International Application No. PCT/JP2018/018173, dated Jul. 10, 2018, 1 page.

*Primary Examiner* — Robert Sandy
*Assistant Examiner* — Louis A Mercado
(74) *Attorney, Agent, or Firm* — Armstrong Teasdale LLP (57) ABSTRACT

An airbag device attached to a vehicle body frame member and covered by a garnish is configured such that when a bag body is deployed, the airbag device pushes out the garnish to create a gap between the garnish and the vehicle body frame member to allow the bag body to be inflated out of the gap. A clip for securing the garnish to the vehicle body frame member includes a first member configured to be fixed to the vehicle body frame member, a second member configured to be fixed to the garnish, and a connecting member for keeping the first member and the second member connected when the airbag is deployed. The first member and the second member are provided with a first inclined planar surface and a second inclined planar surface, respectively, that are slidable relative to each other.

4 Claims, 11 Drawing Sheets

(51) Int. Cl.
*B60R 21/2155* (2011.01)
*F16B 19/00* (2006.01)
(52) U.S. Cl.
CPC .... *F16B 19/002* (2013.01); *B60R 2013/0287* (2013.01); *F16B 2019/006* (2013.01)
(58) Field of Classification Search
CPC .. F16B 19/002; F16B 2019/006; F16B 5/065; F16B 21/073; F16B 21/086
See application file for complete search history.

(56) References Cited

U.S. PATENT DOCUMENTS

| | | | | |
|---|---|---|---|---|
| 8,297,646 | B2* | 10/2012 | Aoki | B60R 13/0206 |
| | | | | 24/457 |
| 8,316,514 | B2* | 11/2012 | Sano | B60R 13/02 |
| | | | | 24/289 |
| 8,408,586 | B2* | 4/2013 | Ohmori | B60R 21/213 |
| | | | | 280/728.2 |
| 8,550,494 | B2* | 10/2013 | Ochiai | B60R 21/232 |
| | | | | 280/728.2 |
| 8,696,018 | B2* | 4/2014 | Yamamoto | B60R 21/217 |
| | | | | 280/728.2 |
| 9,132,789 | B2 | 9/2015 | Suzuki | |
| 9,751,489 | B2* | 9/2017 | Yamamoto | B60R 21/216 |
| 9,821,747 | B2* | 11/2017 | Benedetti | F16B 21/086 |
| 9,982,699 | B2* | 5/2018 | Risdale | F16B 19/002 |
| 2016/0230791 | A1* | 8/2016 | Albach | F16B 5/065 |
| 2018/0222429 | A1* | 8/2018 | Marini | B60R 13/0206 |
| 2020/0114838 | A1* | 4/2020 | Naoi | F16B 19/00 |

* cited by examiner

CLIP

CROSS-REFERENCE TO RELATED APPLICATIONS

This application is a U.S. National Phase Application of PCT/JP2018/018173, filed May 10, 2018, which claims the benefit of priority to JP Application No. 2017-098541, filed May 17, 2017, the contents of which are hereby expressly incorporated by reference in their entirety.

TECHNICAL FIELD

The present invention relates to a clip which, in a vehicle body structure including a vehicle body frame member, an airbag device attached to the vehicle body frame member, and a garnish covering the airbag device, is configured to secure the garnish to the vehicle body frame member.

BACKGROUND ART

A clip for securing a garnish to a vehicle body frame member such as a front pillar and a roof rail is known. For allowing a curtain airbag which is normally received between the vehicle body frame member and the garnish to be deployed in a smooth manner, the clip is configured to deform (extend) under a load from the garnish which is pushed out by the inflating airbag so as to create a gap between the vehicle body frame member and the garnish (see Patent Document 1, for example).

The clip disclosed in Patent Document 1 includes a pin member fixed to the vehicle body pillar, and a base member fixed to the garnish. The main body of the pin member is normally engaged by the base member, but when the airbag is deployed, the engagement is released so that the clip is extended in length until the free end of a stroke part (leg part) extending from the main body of the pin member is engaged by the base member, and a gap for allowing the bag body to be inflated is thereby created between the vehicle body pillar and the garnish. The base member is formed with a recess for receiving a part of the main body of the main body of the pin member and a part of the stroke part under normal condition, and a part of the recess is provided with an inclined surface for guiding the movement of the base member away from the main body of the pin member when the air bag is deployed.

PRIOR ART DOCUMENT(S)

Patent Document(s)

Patent Document 1: JP5576307B2

SUMMARY OF THE INVENTION

Task to be Accomplished by the Invention

When the airbag is deployed, the garnish is caused to move irregularly. Therefore, in the case of the clip disclosed in Patent Document 1, input loads are applied to the base member from multiple directions. Immediately after the base member is detached from the pin member, even if an input load is applied thereto in the lateral direction, the separation movement between the base member and the pin member is guided by the inclined surface. However, once the inclined surface is separated from the pin member, since the lateral movement of the base member is restricted by the wall surface defining the recess of the base member, the base member is allowed to be displaced only in the vertical direction (the direction in which the garnish moves toward and away from the vehicle body pillar). Therefore, when the lateral load is great, the smoothness of the relative movement of the components of the clip may be impaired.

In view of such a problem of the prior art, a primary object of the present invention is to provide a clip that allows the components thereof to move smoothly relative to each other even when the input load applied thereto from the garnish includes a lateral component.

Means for Accomplishing the Task

According to certain embodiments of the present invention, there is provided a clip (10) for use in a vehicle body structure (101), including a vehicle body frame member (102), an airbag device (103) attached to the vehicle body frame member, and a garnish (104) covering the airbag device, to secure the garnish to the vehicle body frame member, the clip comprising: a first member (11) configured to be fixed to the vehicle body frame member; a second member (12) configured to be fixed to the garnish, and engaged by the first member with a prescribed retaining force; and a connecting portion (13) for connecting the first member and the second member to each other so as to prevent the second member from being displaced from the first member beyond a prescribed distance; wherein one of mutually opposing parts of the first member and the second member opposing each other with respect to a movement direction in which the garnish moves toward and away from the vehicle body frame member is provided with a first inclined planar surface (31) which is inclined with respect to the movement direction, and another of the mutually opposing parts of the first member and the second member is provided with a sliding part (30) configured to slide over the first inclined planar surface, the first member and the second member being configured not to collide with each other as the sliding part slides over the first inclined planar surface so as to move the first member and the second member away from each other. Preferably, the first inclined planar surface includes a pair of first inclined planar surfaces formed on the first member, and the first member is provided with a convex portion (21) defined by the first inclined planar surfaces, and the sliding part is formed on the second member as a concave portion complementary to the convex portion, the concave portion being provided with a pair of second inclined planar surfaces configured to slide over the respective first inclined planar surfaces.

According to this arrangement, even when an input load is applied to the second member from multiple directions due to the irregular movement of the garnish, the lateral component of the input load causes the sliding part (second inclined plane) to slide over the first inclined planar surface. Therefore, the second member is guided in a direction to move away from the first member so that the clip can be extended in a smooth manner.

According to certain embodiments of the present invention, in connection with the above arrangement, the clip is configured such that the first member and the second member are provided with side walls that overlap with each other in an extended state where the second member is engaged by the first member with the prescribed retaining force, the side wall of the first member defining the convex portion and the side wall of the second member defining the concave portion, and mutually opposing parts of the side walls are resiliently engaged with each other via a fitting structure such that the second member is allowed to be displaced from the first member by the prescribed distance to establish an extended state when the fitting structure is disengaged.

According to this arrangement, when assembling the second member to the first member, the second inclined planar surfaces slide over the first inclined planar surfaces so that the second member is guided into a position where the fitting structure is engaged. The assembly process is thus facilitated.

According to certain embodiments of the present invention, in connection with the above arrangement, the clip is configured such that fitting structure includes a protrusion formed as a tapered solid of revolution provided on the side wall of one of the first member and the second member, and a circular hole provided on the side wall of another of the first member and the second member and configured to snugly receive the protrusion. "One of the first member and the second member" provided with the protrusion formed as the tapered solid of revolution may either coincide with or not coincide with "one of the first member and the second member" provided with the convex portion.

According to this arrangement, even when the loading applied to the second member is irregular in direction, owing to the circular configuration of the protrusion formed as a tapered solid of revolution such as a hemispherical protrusion and a frusto-conical protrusion and the circular hole, the force required to dislodge the protrusion formed as the tapered solid of revolution from the circular hole is kept constant.

Also, in connection with these arrangements, the connecting portion may be formed as a member separate from the first member and the second member. Alternatively, the connecting portion may be provided with a flexibility, and formed integrally with one of the first member and the second member.

Effect of the Present Invention

Thus, the present invention provides a clip that allows the components thereof to move smoothly relative to each other even when the input load applied thereto from the garnish includes a lateral component.

MODE(S) FOR CARRYING OUT THE INVENTION

A clip 10 according to an embodiment of the present invention is described in the following with reference to the appended drawings.

Figure 10:
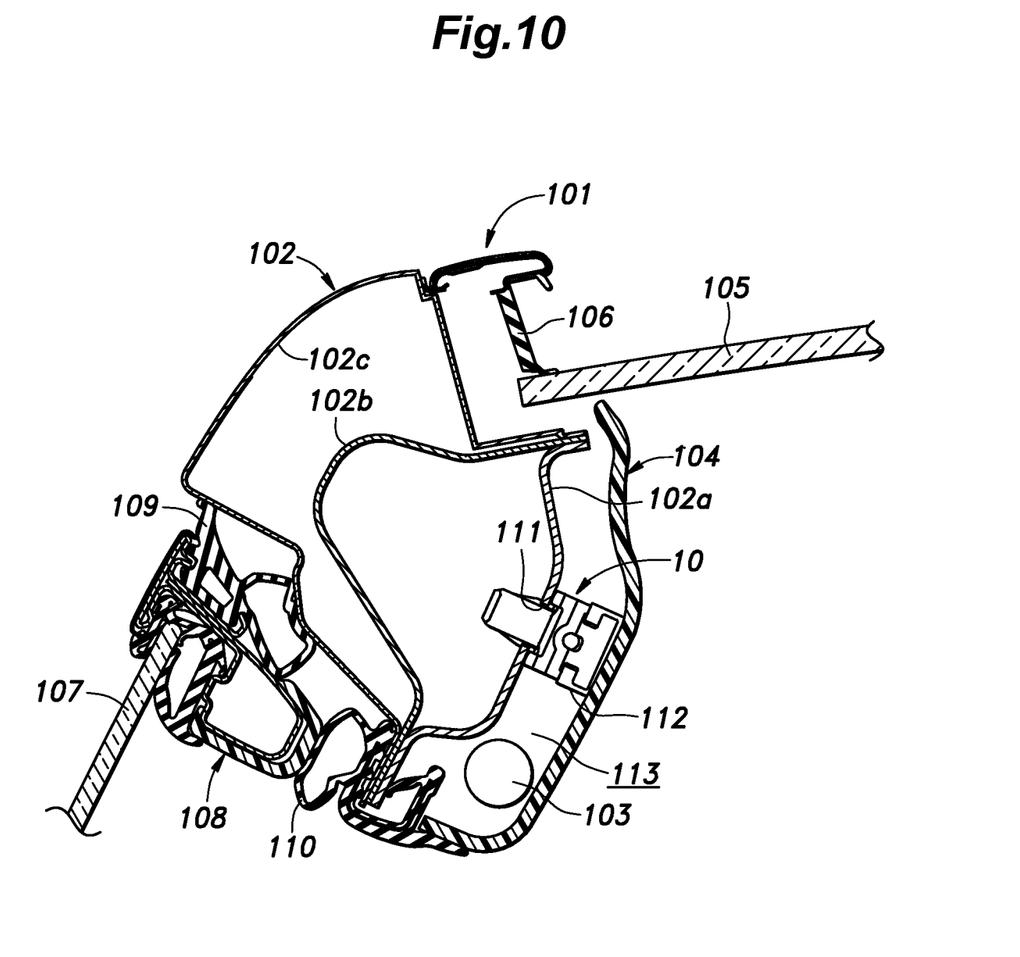
FIG. 10 is a sectional view showing a vehicle body structure fitted with the clip of the embodiment.

As shown in FIG. 10, the clip 10 is used in a vehicle body structure 101, including a front pillar upper 102 forming a vehicle body frame member, an airbag device 103 attached to the front pillar upper 102, and a garnish 104 that covers the airbag device 103, to attach the garnish 104 to the front pillar upper 102.

The front pillar upper 102 includes a front inner upper pillar 102a provided on the vehicle interior side, a front pillar upper stiffener 102b provided on the vehicle exterior side of the front inner upper pillar 102a so as to jointly form a closed cross section structure with the front inner upper pillar 102a, and an outer panel 102c provided on the vehicle exterior side of the front pillar upper stiffener 102b so as to jointly form a closed cross section structure with the front pillar upper stiffener 102b, and is thus provided with a generally hollow structure. The clip 10 is fixed to the front inner upper pillar 102a. A front windshield glass 105 is placed on the front side of the front pillar upper 102, and a gap defined between these two members is covered by a molding 106. A side door 108 provided with a side window glass 107 is provided behind the front pillar upper 102. In the gap defined between the front pillar upper 102 and the side door 108 are provided weather strips 109 and 110.

Figure 11:
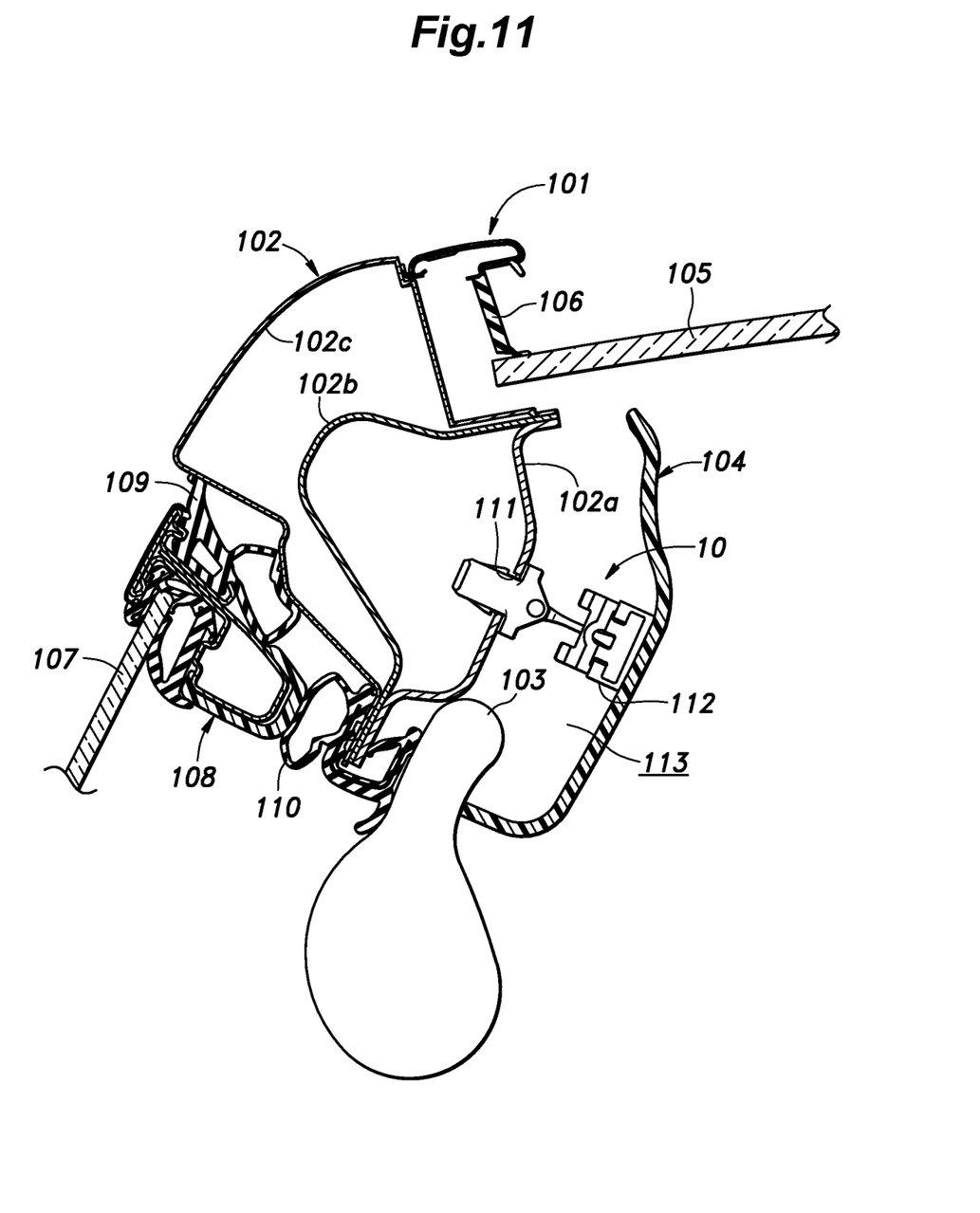
FIG. 11 is a sectional view showing the vehicle body structure fitted with the clip of the embodiment when an airbag device is deployed.

As shown in FIG. 11, when the bag body of the airbag device 103 is inflated and this causes a load (expansion pressure) to be applied to the front pillar upper 102 and the garnish 104 in a direction to push these components away from each other, a gap is created between the front pillar upper 102 and the garnish 104 as a result of the displacement of the garnish 104 away from the front pillar upper 102 by a certain distance so that the bag body of the airbag device 103 is allowed to be deployed through the gap. In the following description, the direction orthogonal to the attachment surface of the clip 10 to the front pillar upper 102 is referred to as the X direction, and the direction along the vertical direction of the vehicle on the attachment surface is generally referred to as the Z direction. The direction perpendicular to the Z direction on the attachment surface is referred to as the Y direction.

As shown in FIGS. 1 to 8, the clip 10 includes a first member 11 fixed to the front pillar upper 102 (see FIG. 10), a second member 12 fixed to the garnish 104 (see FIG. 10) and engaged by the first member 11 by a prescribed retaining force, and a connecting member 13 connecting the first member 11 and the second member 12 to each other so as to prevent the second member 12 from being displaced from the first member 11 by more than a prescribed distance. Hereinafter, a state in which the second member 12 is engaged by the first member 11 with the prescribed retaining force is referred to as a retracted state, and a state in which the connecting member 13 is connecting the first member 11 and the second member 12 so as to prevent the second member 12 from being displaced from the first member 11 by more than the prescribed distance is referred to as an extended state. The first member 11, the second member 12, and the connecting member 13 are each formed by molding a resin material. In addition, the first member 11, the second member 12, and the connecting member 13 are each mirror-symmetric in shape with respect to the XY plane and the XZ plane passing through the central axis.

Figure 1:
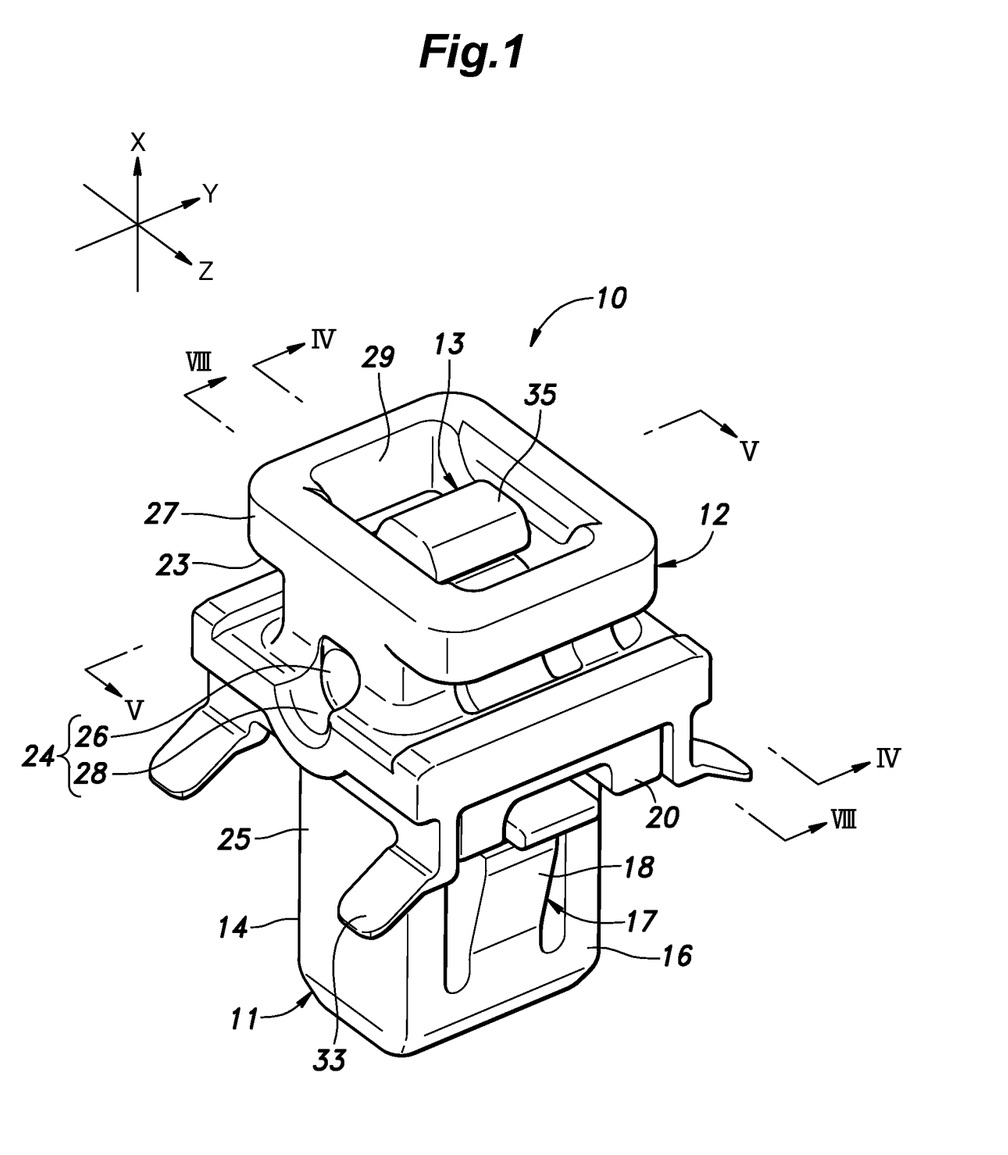
FIG. 1 is a perspective view of a clip (in retracted state) according to an embodiment of the present invention.
Figure 2:
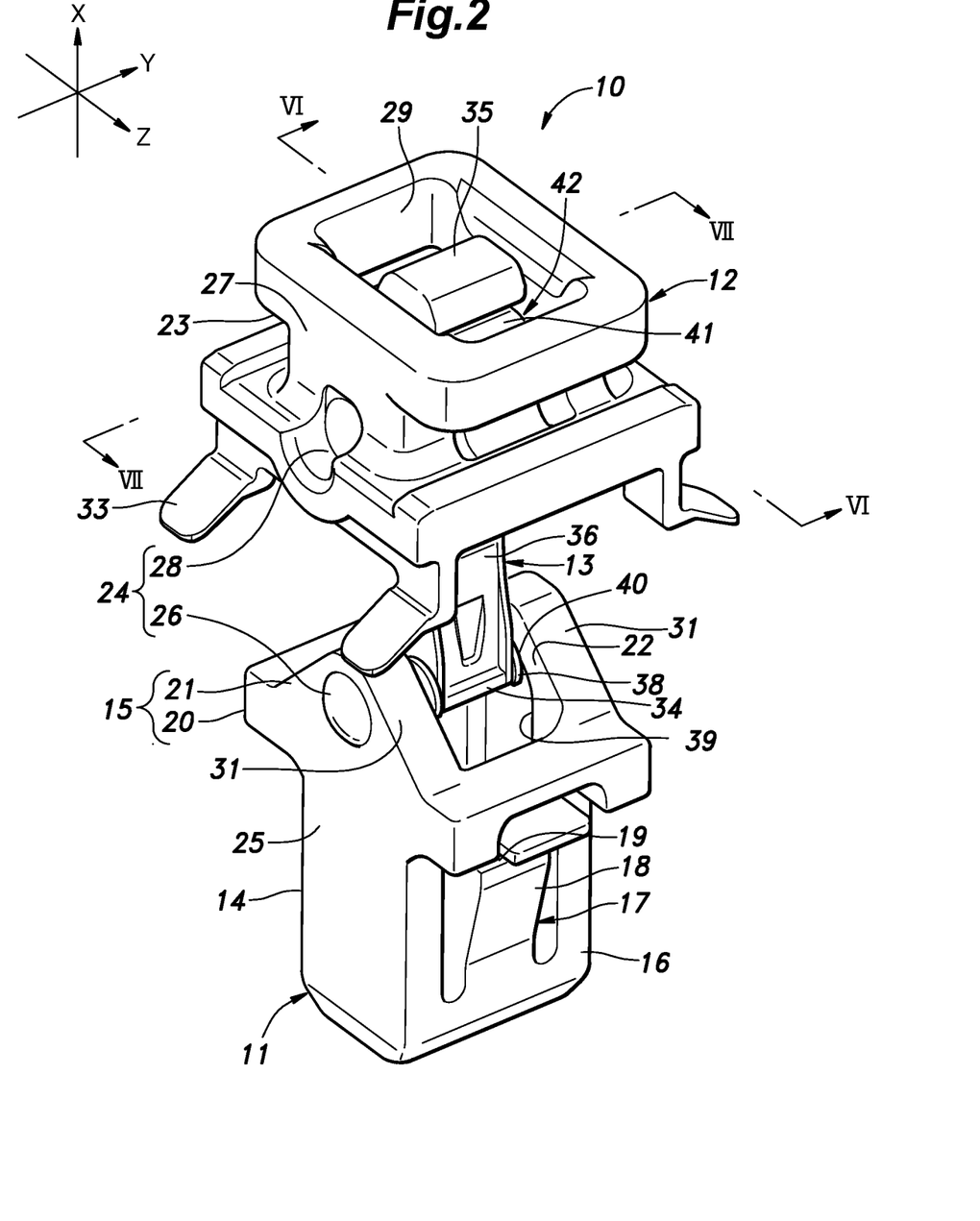
FIG. 2 is a perspective view of the clip according to the embodiment (in extended state)
Figure 3:
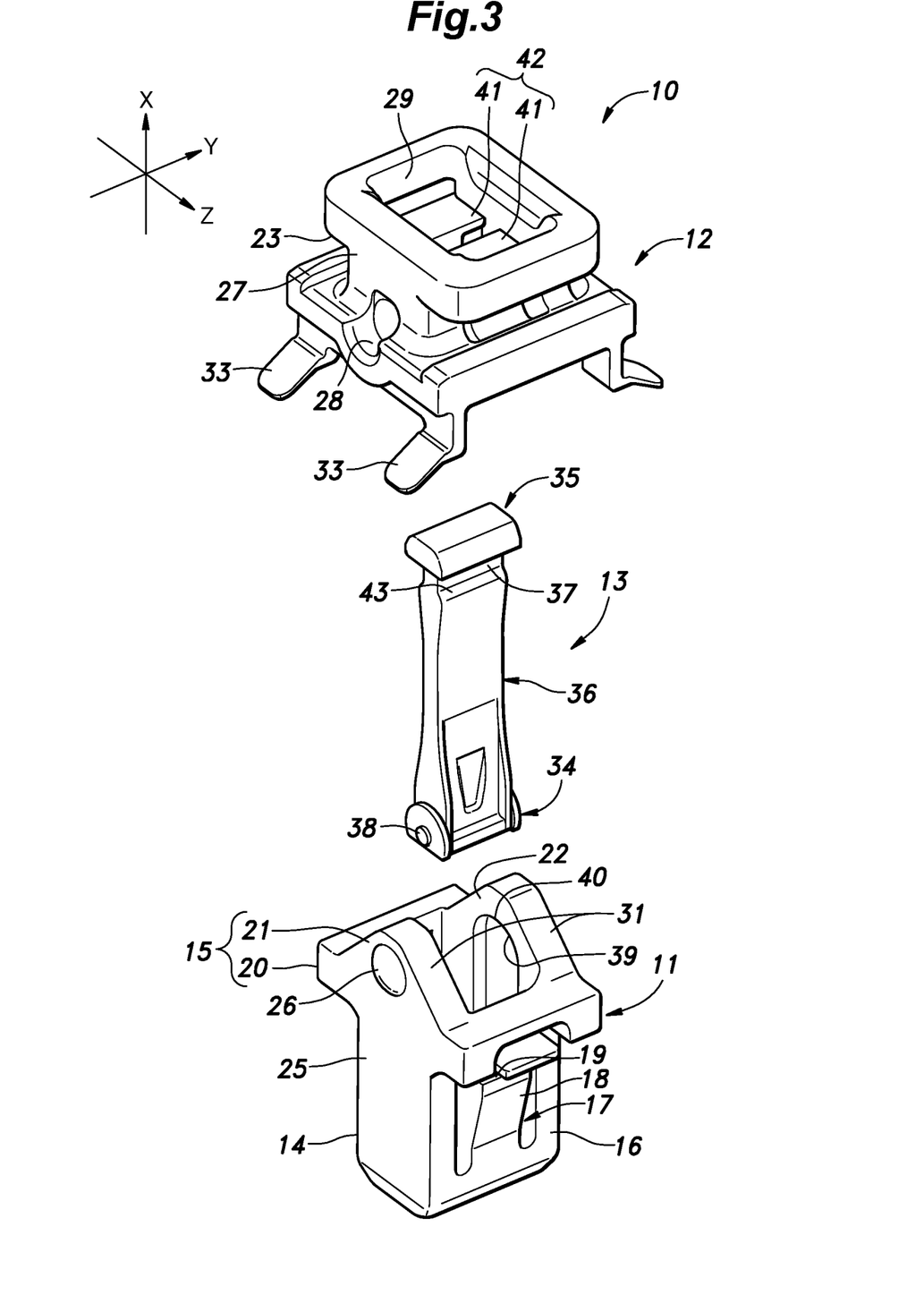
FIG. 3 is an exploded perspective view of the clip according to the embodiment.
Figure 4:
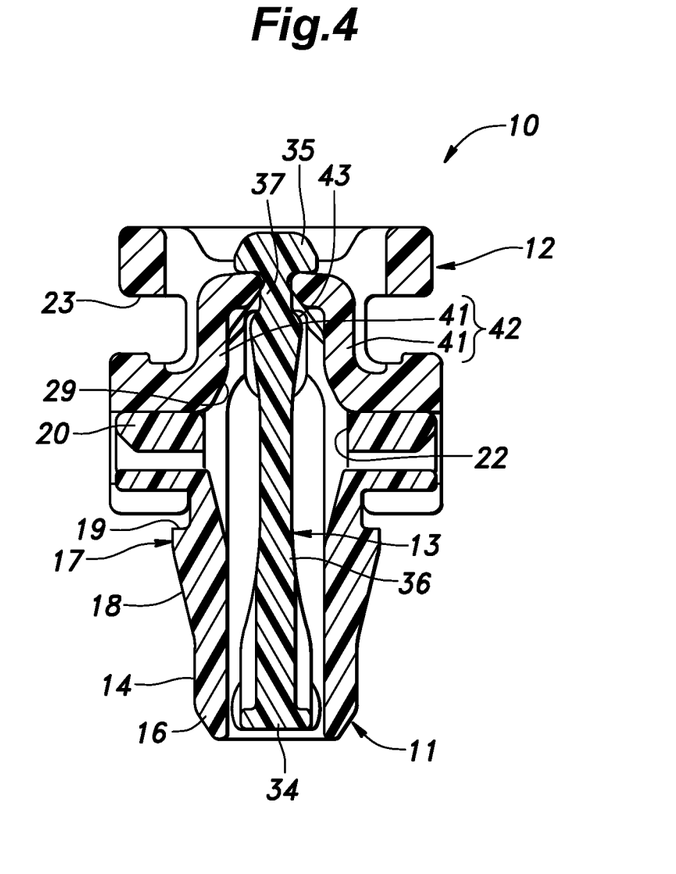
FIG. 4 is a longitudinal sectional view taken along line IV-IV in FIG. 1.
Figure 5:
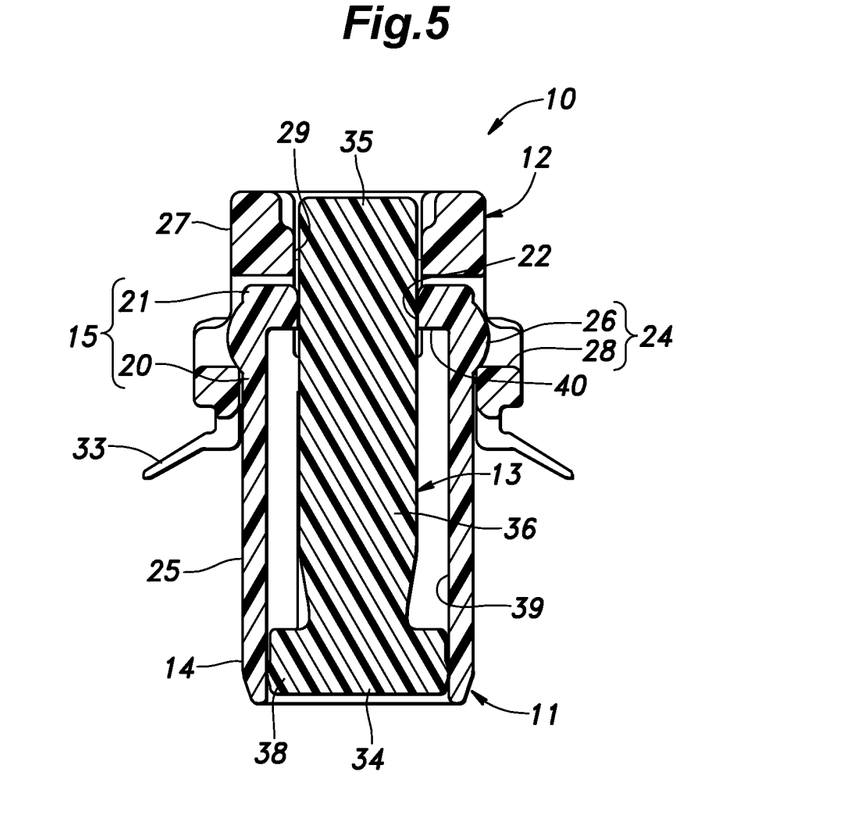
FIG. 5 is a longitudinal sectional view taken along line V-V in FIG. 1.
Figure 6:
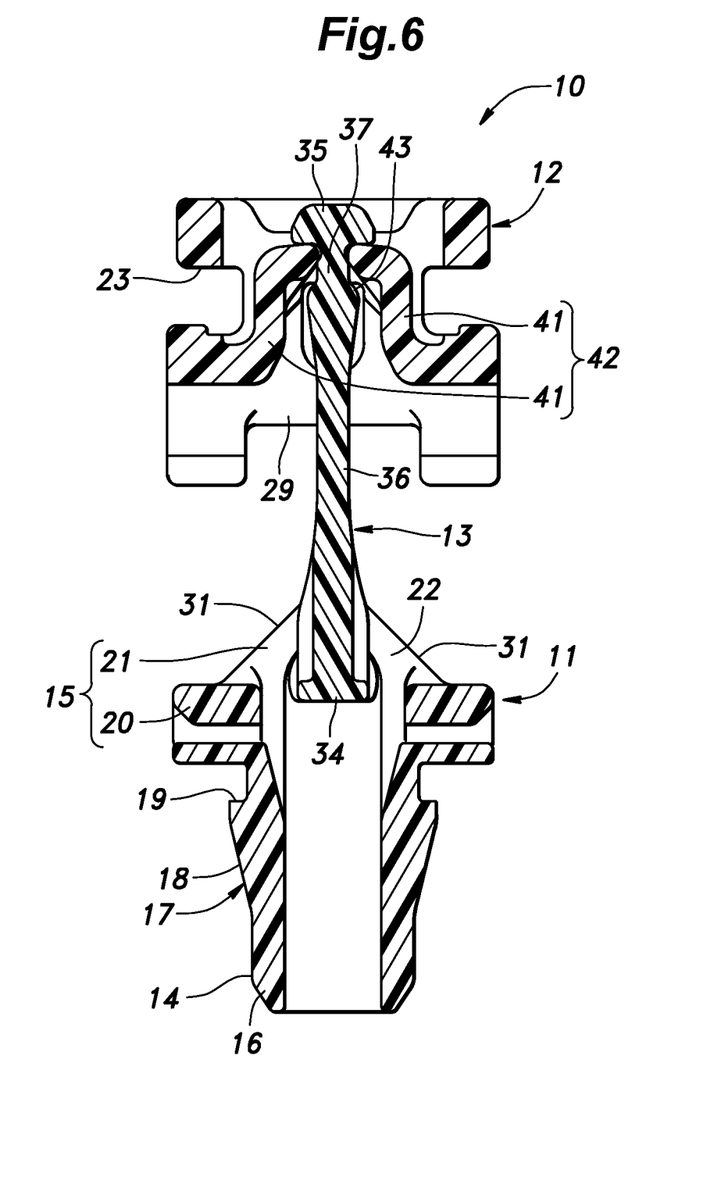
FIG. 6 is a longitudinal sectional view taken along line VI-VI in FIG. 2.
Figure 7:
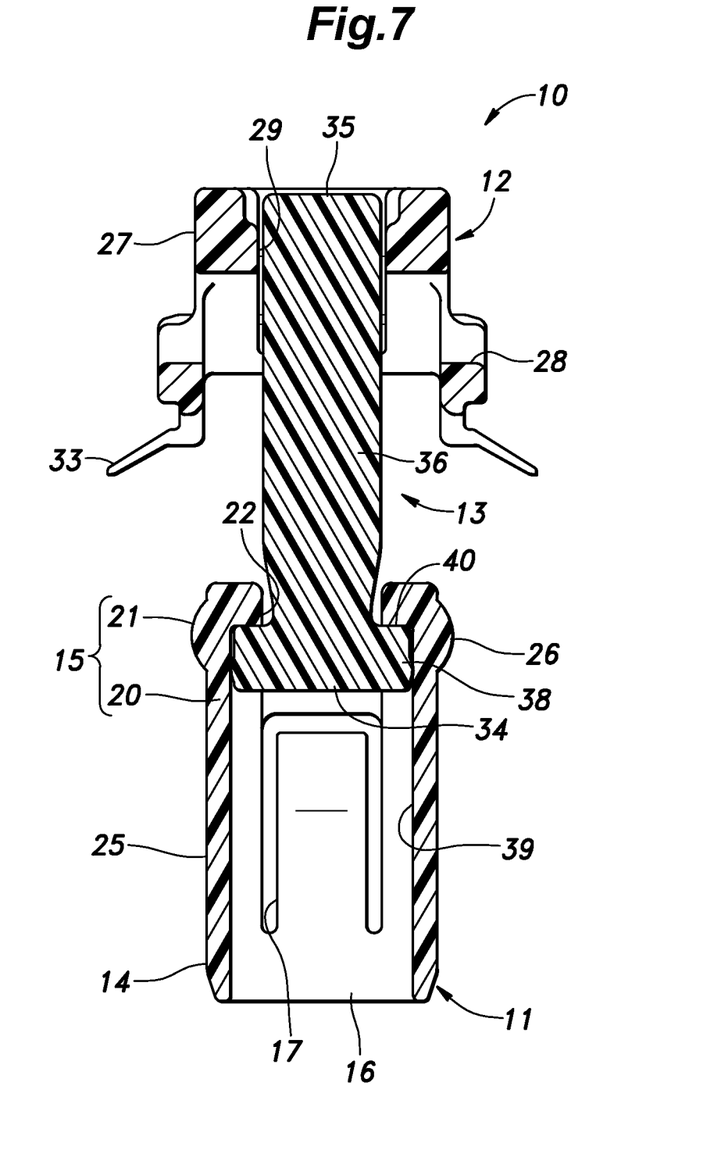
FIG. 7 is a longitudinal sectional view taken along line VII-VII in FIG. 2.

The first member 11 includes a base portion 14 fixed to the front pillar upper 102 and a head portion 15 that is configured to engage the second member 12 with the prescribed retaining force in the retracted state.

The base portion 14 is formed in a substantially rectangular and tubular tube shape, and includes a pair of fixing side walls 16 opposing each other in the Z direction. Each fixing side wall 16 is provided with an engaging piece 17 in the form of a cantilever which is supported at the base end, and configured to be engaged by an opening 111 (see FIG. 10) formed in the front pillar upper 102. The outer surface of each engaging piece 17 is formed with an inclined surface 18 which rises in an outward direction toward the head portion 15 so that the engaging piece 17 is resiliently deformed inward as the first member 11 is inserted into the opening 111 (see FIG. 10). Each engaging piece 17 is provided with a groove 19 in a part thereof closer to the head portion 15 than the inclined surface 18 so that the first member 11 can be fixed to the front pillar upper 102 by causing the edge of the opening 111 to be engaged by the grooves 19 of the engaging pieces 17 as the engaging pieces 17 resiliently regain the original shape thereof.

The head portion 15 is provided with a pair of flanges 20 that face the front pillar upper 102, and a pair of convex portions 21 that protrude away from the base portion 14 proud of the flanges 20 and oppose each other in the Y direction. The flanges 20 extend in the Z direction beyond the expanse of the base portion 14. The outer surfaces of the base portion 14 and the head portion 15 facing in the Y direction are substantially flush with one another. The head portion 15 is formed with a first opening 22 facing in the X direction and communicating with the inner bore of the base portion 14. The first opening 22 receives the connecting member 13 therein.

The second member 12 is formed in a substantially rectangular and tubular shape, and the side walls thereof facing each other in the Z direction are provided with fixing grooves 23, respectively, extending in the Y direction. The second member 12 is configured to be fixed to the garnish 104 by a pedestal portion 112 (see FIG. 10) provided on the back surface of the garnish 104 engaging the fixing grooves 23.

The first member 11 and the second member 12 are provided with a fitting structure 24 for engaging each other with a prescribed retaining force in the retracted state. The fitting structure 24 includes a pair of hemispherical protrusions 26 provided on the outer surfaces of a pair of first engagement side walls 25 of the first member 11 facing in the Y direction, and a pair of circular holes 28 provided in a pair of second engagement side walls 27 of the second member 12 facing in the Y direction, and configured to snugly receive the corresponding hemispherical protrusions 26. In the retracted state, the head side end of the outer surface of each first engagement side wall 25 opposes the front pillar upper side end of the inner surface of the corresponding second engagement side wall 27, and the hemispherical protrusions 26 are fitted into the respective circular holes 28. When a force larger than the prescribed retaining force is applied in a direction to pull the first member 11 and the second member 12 apart, the hemispherical protrusions 26 are dislodged from the respective circular holes 28. At this time, since the hemispherical protrusions 26 and the circular holes are circular in shape, even if the pulling force is inclined in the Z direction with respect to the X direction, the magnitude of the force required for dislodging the hemispherical protrusions 26 from the respective circular holes 28 does not change. It should be noted that the hemispherical protrusion 26 may also have other shapes such as a frusto-conical shape and other tapered solids of revolution.

The tubular second member 12 is provided with a second opening 29 facing in the X direction for allowing the connecting member 13 to be received therein.

Further, the parts of the second member 12 opposing the convex portions 21 of the first member 11 are provided with a pair of concave portions 30 complementary in shape to the corresponding convex portions 21. The convex portions 21 are formed by the tip end parts of the first engagement side walls 25. Since a taper is provided on each convex portion 21 so that the width of the convex portion 21 in the Z direction gets progressively narrower toward the tip end part thereof, the side surfaces of the convex portion 21 are defined by a pair of first inclined planar surfaces 31 that come closer to each other toward the tip end of the convex portion 21. Each concave portion 30 of the second member 12 is formed with a pair of second inclined planar surfaces 32 which are complementary to the corresponding first inclined planar surfaces 31 (see FIG. 8). Each second inclined planar surface 32 is configured to slide over the corresponding first inclined planar surface 31. The second member 12 is provided with an open structure that allows the first member 11 to slide away from the second member 12 without any hindrance as the first inclined planar surfaces 31 and the second inclined planar surface 32 move away from each other. In other words, the second member 12 is not provided with any wall or the like that prevents the first member 11 from moving away from the second member 12 in the sliding direction.

A pair of elastic pieces 33 extend in the Y direction from the end part of each second engagement side wall 27 on the side of the front pillar upper 102, the two elastic pieces 33 being positioned at the two ends of the end part in the Z direction. Each elastic piece 33 is curved so as to come closer to the front pillar upper 102 toward the free end thereof. When the clip 10 is attached to the vehicle body structure 101 in the retracted state, the free ends of the elastic pieces 33 are pressed against the front pillar upper 102 so that the elastic force generated in the elastic pieces 33 suppress the rattling between the first member 11 and the second member 12. As a result, the rattling of the garnish 104 with respect to the front pillar upper 102 is minimized.

The connecting member 13 includes a first end 34 having an enlarged head that is inserted into the first opening 22, a second end 35 having an enlarge head that is inserted into the second opening 29, and a column portion 36 extending between the first end 34 and the second end 35.

The column portion 36 extends in the X direction in the retracted state, and has a rectangular shape elongated in the Y direction in the YZ cross section. The thickness in the Z direction is thin in an intermediate part thereof in the X direction, and gets progressively greater toward the two end portions thereof. However, the part of the column portion 36 connected to the second end 35 is provided with a thinned portion 37 which is formed so as to define a groove extending in the Z direction on each side of this part.

The first end 34 is widened owing to the presence of a pair of protrusions 38 which protrude on either side surface in the Y direction. A pair of guide grooves 39 extending in the X direction are provided on the inner surfaces of the respective first engagement side walls 25 of the first member 11 that oppose each other in the Y direction. Each guide groove 39 receives the corresponding protrusion 38 so as to be slidable in the X direction and rotatable about an axis in the Y direction. The base end side of each guide groove 39 is opened so that the connecting member 13 can be inserted, and the free end side of the guide groove 39 extends to the corresponding convex portion 21 and is closed. The closed end surface on the free end side of each guide groove 39 forms a first locking portion 40 that locks or engages the corresponding protrusion 38 received in the guide groove 39. When the first locking portions 40 lock the protrusions 38, the connecting member 13 is prevented from separating from the first member 11 toward the side of the second member 12. The first locking portions 40 can lock the protrusions 38 with a retaining force greater than the prescribed retaining force between the hemispherical protrusions 26 and the circular holes 28. In particular, the first locking portions 40 and the protrusions 38 are configured to be able to withstand the impact force which is produced when the clip transitions from the retracted state to the extended state. Furthermore, since the first locking portions 40 are formed on the inner surfaces of the respective convex portions 21 formed at the free end of the first member 11, when the protrusions 38 are engaged by the first locking portions 40, the connecting member 13 is able to swing or tilt around the protrusion 38 extending in the Y direction with respect to the first member 11 until the column portion 36 abuts against either one of the flanges 20.

The second end 35 is provided with an enlarged head in such a manner that the thickness thereof in the Z direction is increased. The width of the second end 35 in the Y direction is equal to the width of the column portion 36 in the Y direction. Therefore, the connecting member 13 can be assembled to the first member 11 by inserting the second end 35 from the open ends of the guide grooves 39. Further, the end surface of the second end 35 facing the column portion 36 extends substantially in the Z direction when viewed from the Y direction, and the side surfaces of the second end 35 are curved so as to come closer to each other toward the free end of the second end 35.

The second member 12 is provided with a second locking portion 42 including a pair of engagement claws 41 extending inward from the side walls thereof opposing each other in the Z direction. The base ends of the engagement claws 41 are located closer to the first member 11 than the fixing grooves 23, and intermediate portions of the engagement claws 41 extend substantially in the X direction. The free end portions of the engagement claws 41 extend substantially in the Z direction so that the end surfaces thereof are close to each other, and are located closer to the garnish 104 than the base ends thereof. The free ends of the engagement claws 41 are loosely received by the thinned portion 37.

When the free ends of the engagement claws 41 are received by the thinned portion 37 in the retracted state, the connecting member 13 is received in the first member 11 and the second member 12. Since the free end portions of the engagement claws 41 extend substantially in the Z direction, the intermediate portion and the base end portion of the engagement claws 41 are spaced from the connecting member 13.

In the retracted state, the free ends of the engagement claws 41 are received by the thinned portion 37 so that the second end 35 and a shoulder portion 43 of the column portion 36 defined by the thinned portion 37 are prevented from moving in the X direction. Therefore, the connecting member 13 is maintained to be received in the first member 11 and the second member 12. Therefore, the clip 10 can be reduced in size and the space that is required to receive the airbag device 103 can be reduced in size. The second locking portion 42 and the second end 35 can be kept engaged even when a force greater than the prescribed retaining force between the hemispherical protrusions 26 and the circular holes 28 is applied.

In the extended state, the free ends of the engagement claws 41 are received by the thinned portion 37 and locked to the second end 35 so that the second member 12 is prevented from being detached from the connecting member 13. Further, since the free ends of the engagement claws 41 are loosely received by the thinned portion 37, and the intermediate portions and the base end portions of the engagement claws 41 are spaced from the connecting member 13, the second end can be rotated around the Y direction within a prescribed range. In other words, the connecting member 13 can swing or be tilted around the Y direction relative to the second member 12 within a prescribed range.

The process of assembling the clip 10 is described in the following. First of all, the second end 35 of the connecting member 13 is inserted into the open base ends of the guide grooves 39 of the first member 11. The base end side of the connecting member 13 is held fixed so that the connecting member 13 does not move relative to the first member 11, and the second member 12 is pushed toward the head portion 15 of the first member 11 and the second end portion of the connecting member 13. As a result, the hemispherical protrusions 26 of the first member 11 are fitted into the respective circular holes 28 of the second member 12, and the engagement claws 41 of the second member 12 are received by the thinned portion 37 of the connecting member 13. At this time, the second member 12 is required to be pressed with a relatively large force, but the assembly process is facilitated owing to the centering action provided to the second member 12 owing to the sliding movement between the second inclined planar surfaces 32 of the second member 12 and the first inclined planar surfaces 31 of the first member 11. Thus, the assembly of the clip 10 in the retracted state is completed by assembling the first member 11, the second member 12, and the connecting member 13 with one another in this manner.

Thereafter, the fixing groove 23 of the clip 10 is secured to the pedestal portion 112 of the garnish 104. At this time, the free end portions of the engagement claws 41 are received by the thinned portion 37 so as to engage the second end 35 and the shoulder portion 43 of the connecting member 13 so that the connecting member 13 is kept captivated by the member 11 and the second member 12. Therefore, the connecting member 13 is prevented from protruding from the second member 12, and is thereby prevented from interfering with the process of assembling the clip 10 to the garnish 104.

The garnish 104 is then attached to the front pillar upper 102 by inserting the base portion 14 of the first member 11 into the opening 111 of the front pillar upper 102.

The features and advantages of the clip 10 are described in the following with reference to FIGS. 8 to 11.

As shown in FIG. 10, the bag body of the airbag device 103 in a folded state is accommodated in a space 113 defined between the front inner upper pillar 102a and the garnish 104. The airbag device 103 is provided with an inflator (not shown in the drawings) which is caused to generate gas to deploy the bag body as shown in FIG. 11 when a vehicle crash is detected.

The clip 10 is maintained in the retracted state (see FIGS. 1, 4, and 5) before a vehicle crash occurs, but when the airbag device 103 is activated by a vehicle crash, the bag body of the airbag device 103 expands and pushes out the garnish 104 along with the second member 12 fixed to the garnish 104. As a result, the hemispherical protrusions 26 are dislodged from the circular holes 28, and the extended state (see FIGS. 2, 6, and 7) is produced in which a gap is created between the front inner upper pillar 102a and the garnish 104 so that the bag body of the airbag device 103 can be inflated. The deployed bag body of the airbag device 103 is inflated out of the gap to protect the vehicle occupant.

Figure 8:
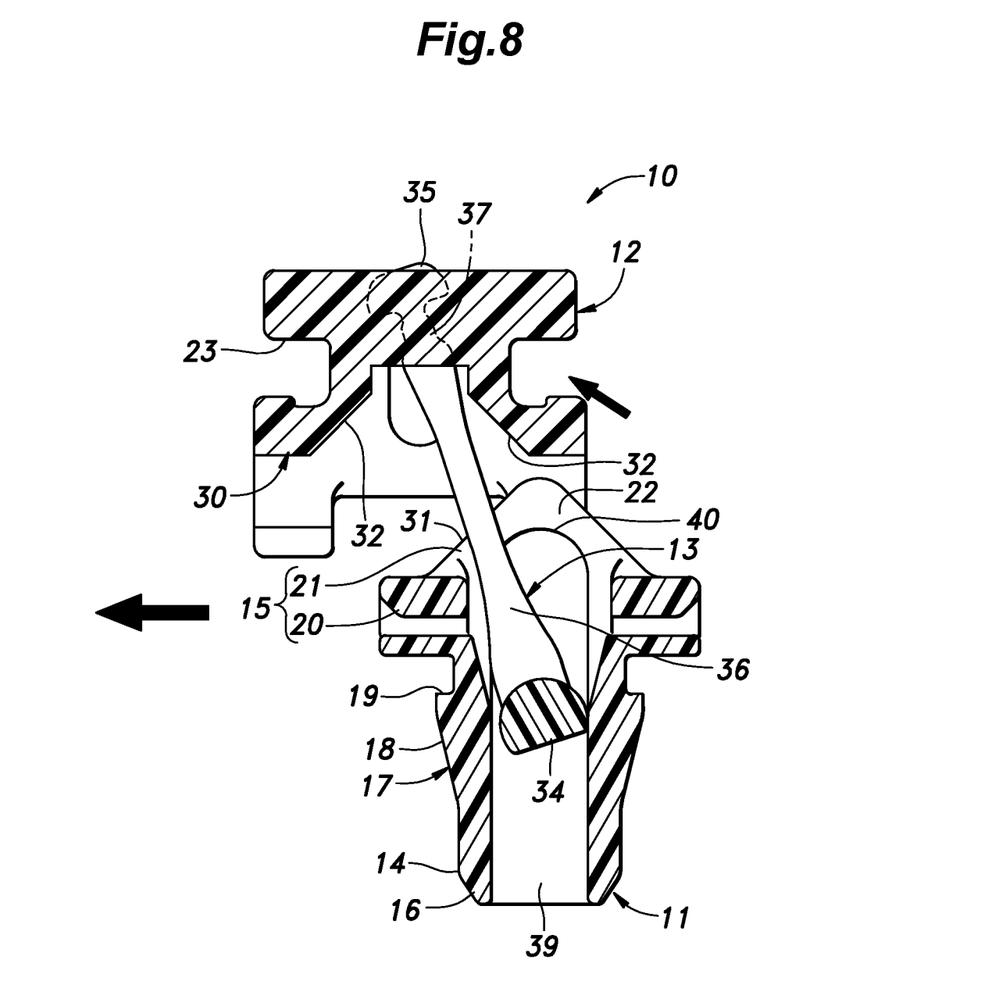
FIG. 8 is a longitudinal sectional view taken along line VIII-VIII in FIG. 1 when a second member is being displaced from a first member.

When the bag body of the airbag device 103 is deployed, the garnish 104 is pushed out by the bag body, and tends to move irregularly. Therefore, the second member 12 receives input loads from multiple directions. In particular, the second member 12 may be subjected to an input load which is directed in the lateral direction with respect to the direction (X direction) in which the garnish 104 faces the front inner upper pillar 102a. As shown in FIG. 8, when subjected to a load directed in the Z direction, the second inclined planar surfaces 32 are guided in the X direction as the first inclined planar surfaces 31 slide over the second inclined planar surfaces 32. Further, the first member 11 or the second member 12 is not provided with any walls or other features that hinder the movement of the second member 12 relative to the first member 11 in the guided direction or the movement of the second member 12 away from the first member 11 involving the sliding movement of the first inclined planar surfaces 31 relative to the second inclined planar surfaces 32. Therefore, the clip 10 is enabled to transition from the retracted state to the extended state without any risk of being hindered.

Figure 9:
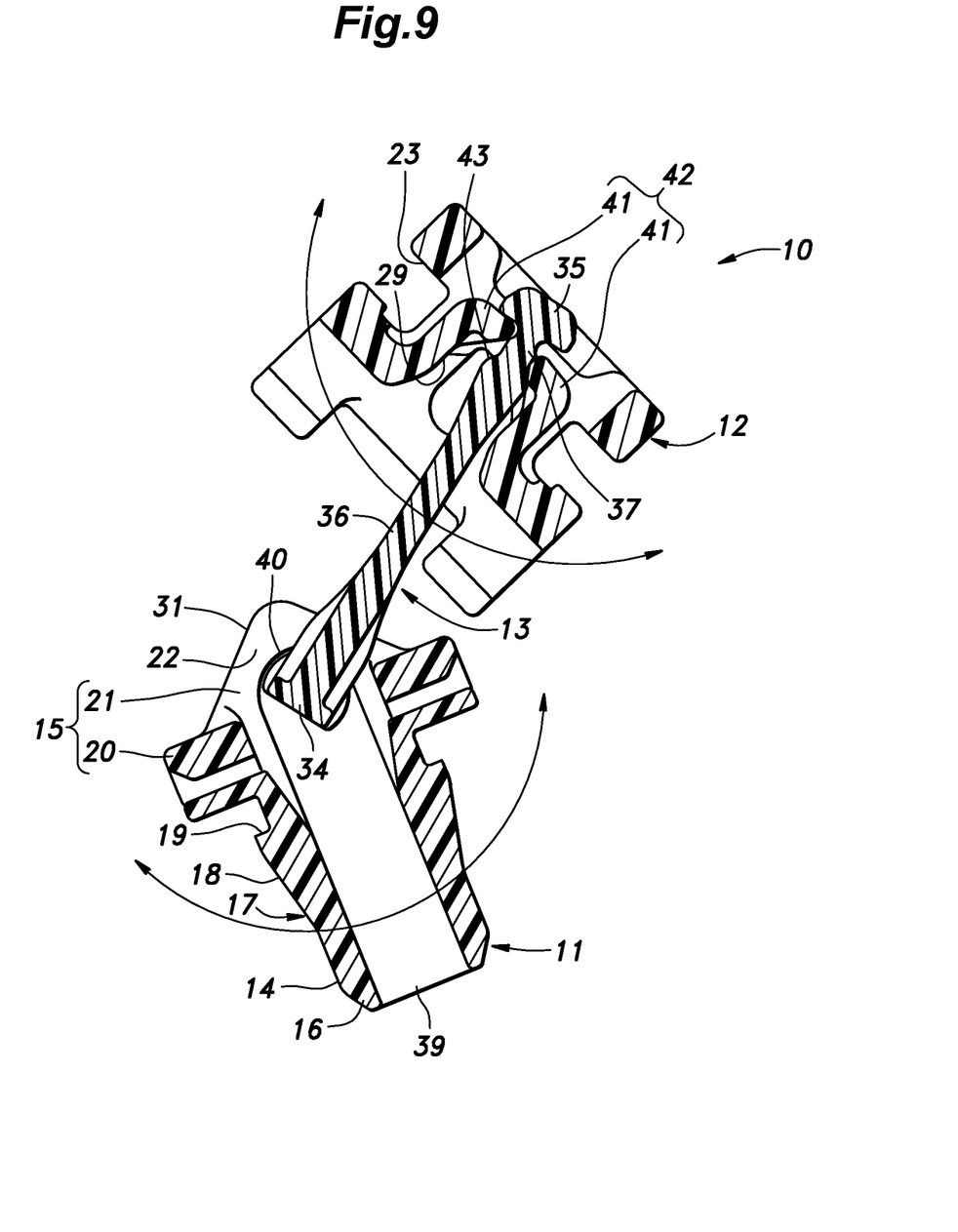
FIG. 9 is a longitudinal sectional view similar to FIGS. 4 and 6 showing a tilting movement of a connecting member relative to the first member and the second member.

Further, when the bag body of the airbag device 103 is deployed, the garnish 104 moves irregularly but generally along an arcuate path until a gap is created between the garnish 104 and the front pillar upper 102. As shown in FIG. 9, since the connecting member 13 can tilt in the Y direction with respect to the first member 11 and the second member 12 in the extended state, the clip 10 is able to follow the movement of the garnish 104 along an arcuate path. Since the connecting member 13 is formed as a separate member from the first member 11 and the second member 12, and is configured to be tiltable with respect to the first member 11 and the second member 12, the connecting member 13 is not required to be made of a flexible soft material, but can be made from a wide range materials which have high mechanical strengths and low in cost. For example, the material of the first member 11 may be polyethylene terephthalate, the material of the second member 12 may be polyacetal, and the material of the connecting member 13 may be polyethylene terephthalate or polyacetal.

Further, since the connecting member 13 can be tilted with respect to both the first member 11 and the second member 12, the movable range of the second member 12 relative to the first member 11 is increased. More specifically, the tiltable angle of the second member 12 with respect to the first member 11 in the extended state can be maximized. The tiltable range of the connecting member 13 relative to the first member 11 may be more limited when the clip 10 is transitioning from the retracted state to the extended state as compared to the case where the clip 10 is in the extended state, but since the tiltable range of the connecting member 13 relative to the second member 12 during such a period is substantially equal to that in the extended state, the second member 12 is enabled to tilt with respect to the first member 11 by a required range so that the clip 10 is enabled to follow the irregular and arcuate movement of the garnish 104.

Further, by forming the connecting member 13 as a separate member from the first member 11 and the second member 12, the connecting member 13 can be accommodated in the first member 11 and the second member 12 in the retracted state (FIGS. 1, 4, and 5), and space can be saved.

The present invention has been described in terms of a specific embodiment, but is not limited by such an embodiment, and can be modified in various ways without departing from the spirit of the present invention. For instance, the shape of the convex portions may not be defined by inclined planar surfaces as long the first inclined planar surfaces can slide relative thereto. Further, when space is available, and the connecting member is allowed to be made of a flexible soft material, the connecting member and the first member may be formed as a single-piece integral component, and the connecting member may not be rotatable with the first member and the second member. Also, the concave portions may be formed in the first member while the convex portions are formed in the second member. The circular holes may be formed in the first member while the tapered projections formed as solids of revolution are formed in the second member. The various components of the foregoing embodiment are not entirely essential for the present invention, and can be appropriately retained and omitted without departing from the spirit of the present invention. The contents of the original application on which the Convention priority is claimed, as well as the contents of the prior art mentioned in the disclosure, are incorporated in the present application in full by reference.

Glossary of Terms

| | |
|---|---|
| 10: clip | 11: first member |
| 12: second member | |
| 13: connecting member (connecting portior) | |
| 21: convex portion | 22: first opening |
| 24: fitting structure | 26: hemispherical protrusion |
| 28: circular hole | 29: second opening |
| 30: concave portion (sliding part) | 31: first inclined planar surface |
| 32: second inclined planar surface | 34: first end |
| 35: second end | 36: pillar portion |
| 37: thinned portion | 38: protrusion |
| 39: guide groove | 40: first locking portion |
| 41: engagement claw | 42: second locking portion |
| 101: vehicle body structure | |
| 102: front pillar upper (vehicle body frame member) | |
| 103: airbag device | 104: garnish |

The invention claimed is:

1. A clip for use in a vehicle body structure, including a vehicle body frame member, an airbag device attached to the vehicle body frame member, and a garnish covering the airbag device, to secure the garnish to the vehicle body frame member, the clip comprising:

a first member configured to be fixed to the vehicle body frame member;

a second member configured to be fixed to the garnish, and engaged by the first member with a prescribed retaining force; and a connecting portion for connecting the first member and the second member to each other so as to prevent the second member from being displaced from the first member beyond a prescribed distance;

wherein one of mutually opposing parts of the first member and the second member opposing each other with respect to a movement direction in which the garnish moves toward and away from the vehicle body frame member is provided with a first inclined planar surface which is inclined with respect to the movement direction, and another of the mutually opposing parts of the first member and the second member is provided with a sliding part configured to slide over the first inclined planar surface, the first member and the second member being configured not to collide with each other in a direction that the sliding part is guided by the first inclined planar surface when the first member and the second member move away from each other, and wherein the connecting portion is formed as a member separate from the first member and the second member.

2. The clip according to claim 1, wherein the first inclined planar surface includes a pair of first inclined planar surfaces formed on the first member, and the first member is provided with a convex portion defined by the first inclined planar surfaces, and the sliding part is formed on the second member as a concave portion complementary to the convex portion, the concave portion being provided with a pair of second inclined planar surfaces configured to slide over the respective first inclined planar surfaces.

3. The clip according to claim 2, wherein the first member and the second member are provided with side walls that overlap with each other in an extended state where the second member is engaged by the first member with the prescribed retaining force, the side wall of the first member defining the convex portion and the side wall of the second member defining the concave portion, and mutually opposing parts of the side walls are resiliently engaged with each other via a fitting structure such that the second member is allowed to be displaced from the first member by the prescribed distance to establish an extended state when the fitting structure is disengaged.

4. The clip according to claim 3, wherein the fitting structure includes a protrusion formed as a tapered solid of revolution provided on the side wall of the first member, and a circular hole provided on the side wall of the second member and configured to snugly receive the protrusion.

* * * * *